United States Patent
Lee et al.

(10) Patent No.: US 9,145,933 B2
(45) Date of Patent: Sep. 29, 2015

(54) METHOD OF ADJUSTING CHARACTERISTICS OF DRY CLUTCH

(71) Applicants: Hyundai Motor Company, Seoul (KR); Kia Motors Corp., Seoul (KR)

(72) Inventors: Ho Young Lee, Whasung-Si (KR); Seung Sam Baek, Whasung-Si (KR); Young Min Yoon, Whasung-Si (KR)

(73) Assignees: HYUNDAI MOTOR COMPANY, Seoul (KR); KIA MOTORS CORP., Seoul (KR)

( * ) Notice: Subject to any disclaimer, the term of this patent is extended or adjusted under 35 U.S.C. 154(b) by 0 days.

(21) Appl. No.: 14/500,128

(22) Filed: Sep. 29, 2014

(65) Prior Publication Data

US 2015/0167759 A1  Jun. 18, 2015

(30) Foreign Application Priority Data

Dec. 17, 2013  (KR) .................. 10-2013-0157643

(51) Int. Cl.
*F16D 48/06* (2006.01)
*F16H 61/02* (2006.01)
*F16H 61/00* (2006.01)

(52) U.S. Cl.
CPC ........ *F16D 48/06* (2013.01); *F16H 2061/0087* (2013.01); *F16H 2061/0223* (2013.01); *F16H 2061/0225* (2013.01)

(58) Field of Classification Search
CPC ............... F16H 2061/0225; F16H 2061/0223; F16H 2061/0087; B60W 10/02; B60W 2510/02; B60W 2510/08; B60W 2510/0216; B60W 2710/027
USPC .................................. 701/59, 61, 68
See application file for complete search history.

(56) References Cited

U.S. PATENT DOCUMENTS

| | | | |
|---|---|---|---|
| 8,594,901 B1 * | 11/2013 | Yoon et al. ..................... 701/90 |
| 2010/0138121 A1 | 6/2010 | Porta et al. | |
| 2013/0018556 A1 * | 1/2013 | Williams et al. ............... 701/60 |
| 2013/0317683 A1 * | 11/2013 | Terakawa et al. .............. 701/22 |
| 2014/0121924 A1 * | 5/2014 | Yoon et al. ..................... 701/67 |
| 2014/0121926 A1 * | 5/2014 | Yoon et al. ..................... 701/68 |
| 2014/0188357 A1 * | 7/2014 | Yoon .............................. 701/68 |

FOREIGN PATENT DOCUMENTS

| | | | |
|---|---|---|---|
| JP | 4394386 B2 | 1/2010 |
| JP | 2011-214427 A | 10/2011 |
| JP | 4937569 B2 | 5/2012 |
| KR | 10-1998-037707 A | 8/1998 |
| KR | 2003-0045059 A | 6/2003 |
| KR | 10-2009-0061752 A | 6/2009 |

* cited by examiner

*Primary Examiner* — Justin Holmes
(74) *Attorney, Agent, or Firm* — Morgan, Lewis & Bockius LLP

(57) ABSTRACT

A method of adjusting the transmission torque characteristics of a dry clutch may include carrying out adjustment based on learning using a T-S curve that indicates the relationship of the transmission torque to the actuator stroke of the dry clutch, a section of the T-S curve in which inclinations change discontinuously is removed, so that the controllability over the dry clutch is reliable and the feeling of shifting can be improved.

6 Claims, 3 Drawing Sheets

METHOD OF ADJUSTING CHARACTERISTICS OF DRY CLUTCH

CROSS REFERENCE TO RELATED APPLICATION

The present application claims priority of Korean Patent Application Number 10-2013-0157643 filed on Dec. 17, 2013, the entire contents of which application are incorporated herein for all purposes by this reference.

BACKGROUND OF THE INVENTION

1. Field of the Invention

The present invention relates, in general, to a method of adjusting the characteristics of a dry clutch used in an automated manual transmission (AMT) or a double clutch transmission (DCT), and more particularly, to a method of adjusting the transmission torque characteristics of a dry clutch with respect to the stroke of an actuator which actuates the dry clutch.

2. Description of Related Art

Semi-automatic transmissions, such as automated manual transmissions (AMTs) and double clutch transmissions (DCTs), are systems which automatically control a manual transmission mechanism. Unlike typical automatic transmissions (ATs) which use a torque converter and a wet multi-plate clutch, semi-automatic transmissions frequently use a dry clutch to transmit engine torque to a transmission mechanism.

The dry clutch is controlled by an actuator, which is generally controlled based on a T-S curve that presents variations in the transmission torque of the dry clutch with respect to the stroke of the actuator.

The dry clutch is characterized in that the transmission torque thereof significantly varies depending on a variety of factors, such as a single part tolerance of each element, a degree of wear due to the duration of use, thermal deformation at high temperature and a variation in the coefficient of friction of a disk. It is difficult to convert the transmission torque of the dry clutch into a preset form of data.

However, the dry clutch fails to properly reflect variations in the characteristics of the transmission torque when controlling the actuator. When the actuator is controlled insufficiently or excessively, the dry clutch may slip excessively or be subjected to impact. There is required a technique for accurately finding transmission torque characteristics of the dry clutch depending on the actuator stroke so as to be used for control over the actuator.

Therefore, in the vehicle, a T-S curve presenting the characteristics of transmission torque with respect to the stroke of the actuator of the dry clutch is adjusted by learning such that the present state of the dry clutch can be reflected as accurately as possible. FIG. 1 is graph illustrating a conventional method of adjusting a T-S curve by learning.

In FIG. 1, P02 to P11 are characteristic points that reflect the characteristics of the T-S curve. The characteristic points P02 to P11 can be changed by learning. For instance, when a learning point P is newly learned, the existing T-S curved is adjusted based on the new learning point. As shown in the figure, the characteristics points P08 and P09 that are most close to the learning point P are moved in the direction toward the learning point. At this time, the characteristics points P10 and P11 are also moved by applying the same amount of change thereto, such that the inclination of the section of the T-S curve to which these points belong can stay unchanged.

With respect to the learning point P, a uniform amount of change is given for upper torque components, and no amount of change is given for lower torque components. This is intended to maintain transmission characteristics defined by the spring stiffness of the dry clutch system.

When the T-S curve is adjusted by learning as above, the inclination of the section of the T-S curve including the characteristic points P06 and P07 and newly-moved point $P08_{NEW}$ is significantly changed. This shape of the T-S curve indicates that the required change of the stroke must be discontinuous along the section in the case in which the transmission torque is changed by a uniform amount. This discontinuous change of the stroke makes the control difficult and inaccurate. This consequently leads to uncomfortable feel when shifting.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of adjusting the transmission torque characteristics of a dry clutch, in which, when adjustment is carried out based on learning using a T-S curve that indicates the relationship of the transmission torque to the actuator stroke of the dry clutch, a section of the T-S curve in which inclinations change discontinuously is removed, so that the controllability over the dry clutch is reliable and the feeling of shifting can be improved.

In order to achieve the above object, according to one aspect of the present invention, a method of adjusting characteristics of a dry clutch in a vehicle, may include when a T-S curve is adjusted with a new learning point, examining inclinations between characteristic points on the T-S curve in vicinity to the new learning point and determining whether the inclinations change by a predetermined reference value or greater, when the determining of whether the inclinations change by the predetermined reference value or greater determines that inclinations at a characteristic point change greater than the predetermined reference valve, creating offset points using the characteristic point as a reference characteristic point such that the offset points are spaced a predetermined distance in a vertical direction along a direction of torque from the reference characteristic point, creating a tendency line using the reference characteristic point and the offset points created at the process of creating the offset points, and adjusting the reference characteristic point by moving the reference characteristic point along the tendency line.

The method may further include repeating the process of determining whether the inclinations change by the predetermined reference value or greater after adjusting the reference characteristic point, and when the inclinations change within the predetermined reference value, terminating control, and when the inclinations change greater than the predetermined reference value, creating the offset points by changing amounts of offsets at the process of creating the offset points, and then repeating the process of creating the tendency line and the process of adjusting the reference characteristic point.

Creating the offset points may include creating the offset points on straight lines which are respectively connected from the reference characteristic point to two different characteristic points that are positioned below and above the reference characteristic point.

The amounts with which the offset points are distanced upward and downward from the reference characteristic point are set depending on an amount with which the inclination of the reference characteristic point changes.

Creating the tendency line may include the tendency line from the reference characteristic point and the offset points, which are created at the process of creating the offset points, by a least square method.

Adjusting the reference characteristic point may include moving the reference characteristic point of the offset points in a lateral direction following a direction of stroke to arrive at a point that is on the tendency line.

As set forth above, when adjustment is carried out based on learning using a T-S curve that indicates the relationship of the transmission torque to the actuator stroke of the dry clutch, a section of the T-S curve in which inclinations change discontinuously is removed, so that the controllability over the dry clutch is reliable and the feel of shifting can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
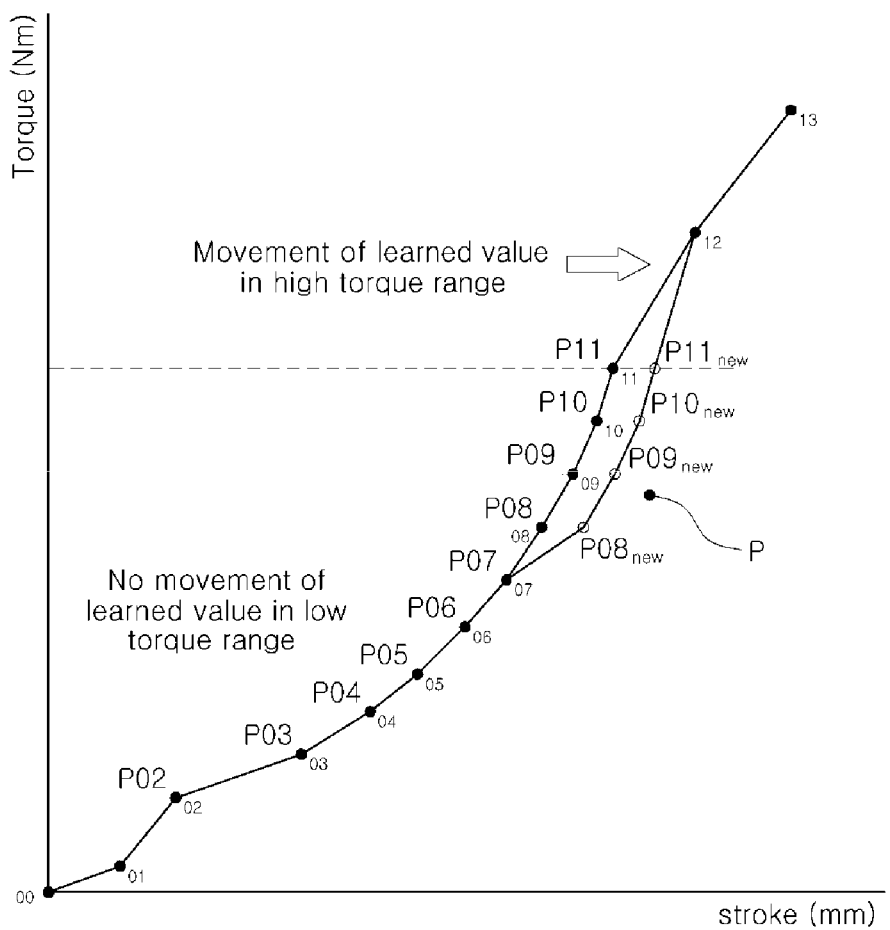
FIG. 1 is graph illustrating a conventional method of adjusting a T-S curve by learning.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in greater detail to an exemplary embodiment of the present invention, an example of which is illustrated in the accompanying drawings. Wherever possible, the same reference numerals will be used throughout the drawings and the description to refer to the same or like parts.

Figure 2:
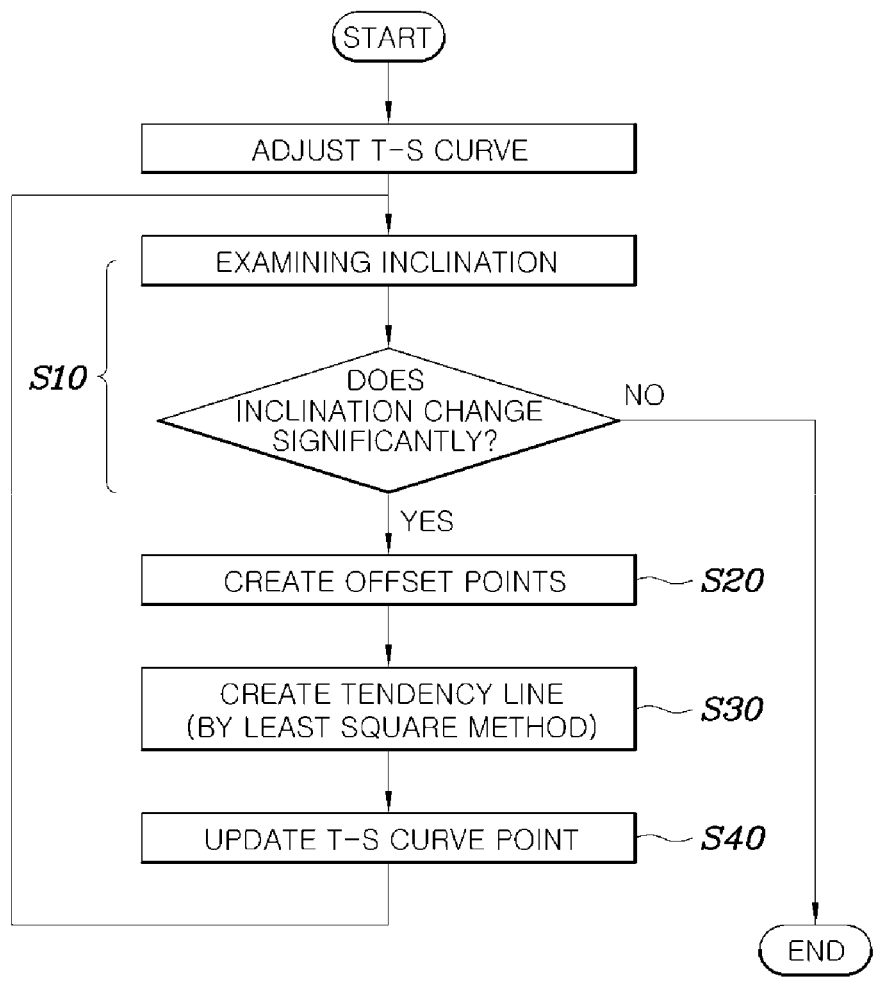
FIG. 2 is a flowchart showing a method of adjusting characteristics of a dry clutch in a vehicle according to an exemplary embodiment of the present invention.

Referring to FIG. 2, a method of adjusting characteristics of a dry clutch in a vehicle according to an exemplary embodiment of the present invention includes an inclination determination step S10 of, when a T-S curve is adjusted with a new learning point, examining inclinations between characteristic points on the T-S curve in vicinity to the new learning point and determining whether or not the inclinations change by a predetermined reference value or greater, an offset creating step S20 of, if the inclination determination step S10 determines that inclinations at a characteristic point changes, for instance, by the predetermined reference value or greater, creating offset points using the characteristic point, as a reference characteristic point such that the offset points are spaced a predetermined distance in a vertical direction along a direction of torque from the reference characteristic point, a tendency creating step S30 of creating a tendency line using the reference characteristic point and the offset points created at the offset creating step S20, and characteristic point adjusting step S40 of moving the reference characteristic point along the tendency line.

According to this exemplary embodiment, if the inclination of a section on the T-S curve in vicinity of the specific learning point significantly changes as the T-S curve is adjusted with the learning point, the significant change is adjusted through the offset creating step S20, the tendency creating step S30 and the characteristic point adjusting step S40, thereby preventing the inclination from significantly changing while maintaining the proper characteristics of the T-S curve. It is therefore possible to eventually ensure that the controllability over the dry clutch be reliable and improve the feeling of shifting.

Of course, in some cases, the change in the inclination may not be satisfactorily removed after the above-described processes. For this, it is preferred that the method executes the inclination determination step S10 again after the characteristic point adjusting step S40. The method can carry out terminating the control if the inclinations change within the predetermined reference value, or creating the offset points by changing the amounts of offsets at the offset creating step S20 if the inclinations change greater than the predetermined reference value, and then repeating the tendency creating step S30 and the characteristic point adjusting step S40.

Figure 3:
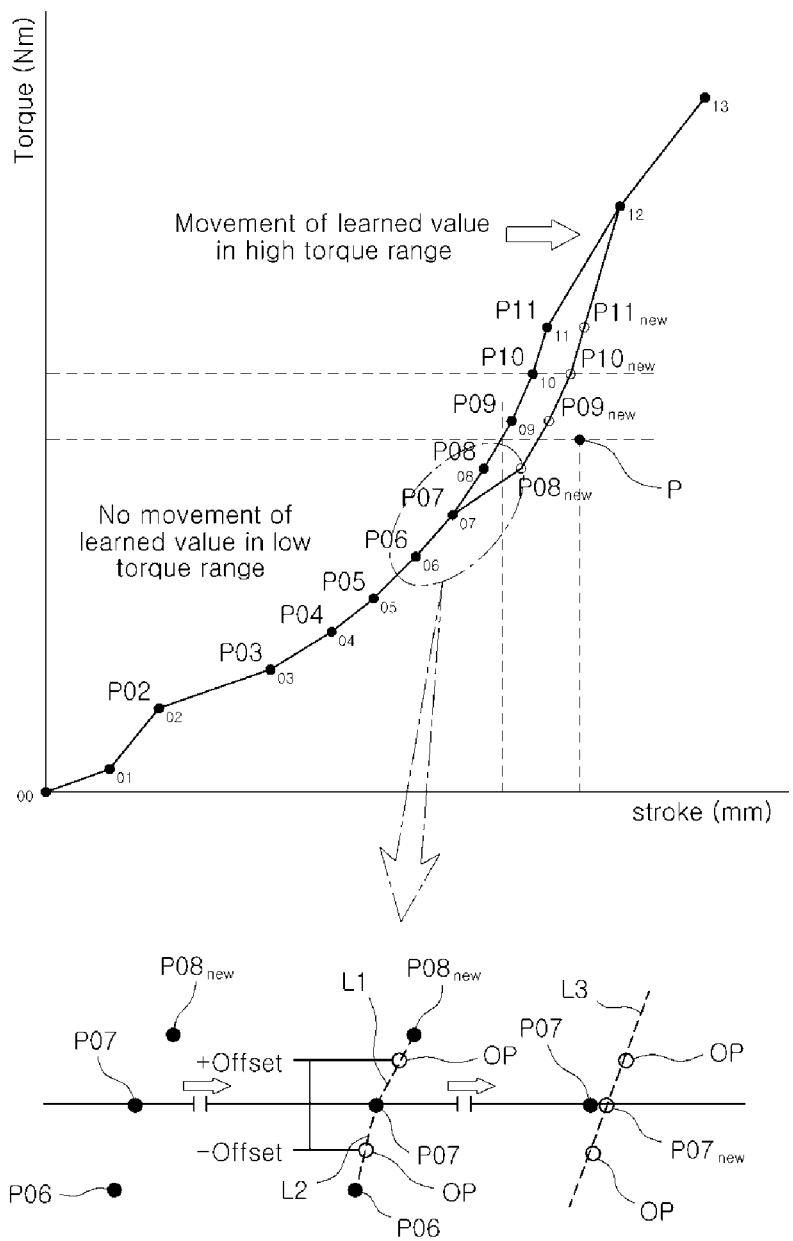
FIG. 3 is a graph illustrating the method of adjusting characteristics of a dry clutch in a vehicle according to an exemplary embodiment of the present invention.

Referring to FIG. 3, when the learning point P is learned and thus the characteristic points P08 to P11 move to the right as in FIG. 1, a significant change in the inclination occurs at the characteristic point P07. Then, the inclination determination step S10 determines that the inclination at the characteristic point P07 has a significant change. As shown in the enlarged part of FIG. 3, the offset points OP are created at the offset creating step S20, the tendency line is created at the tendency creating step S30, and then the characteristic point P07 is moved to $P07_{NEW}$ in the direction toward the tendency line. In this manner, the significant change in the inclination at the characteristic point P07 is removed.

As shown in FIG. 3, the offset creating step S20 creates the offset points OP on straight lines L1 and L2 which are respectively connected from the characteristic point P07, or the reference point, to the two different characteristic points P06 and $P08_{NEW}$, which are positioned below and the above the reference characteristic point.

It is preferred that the amounts with which the offset points OP are distanced upward and downward from the reference characteristic point P07 at the offset creating step S20 are set depending on the amount with which the inclination of the reference characteristic point changes.

At the tendency creating step S30, the tendency line L3 is formed from the reference characteristic point P07 and the offset points OP created at the offset creating step S20 by the least square method.

At the characteristic point adjusting step S40, the characteristic point P07, i.e. the reference characteristic point of the offset points, is moved to the right or left following the direction of the stroke so as to arrive at the point $P07_{NEW}$ that is on the tendency line.

For reference, in FIG. 3, the direction of the stroke indicates a lateral direction, and the direction of the torque indicates a vertical direction.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of adjusting characteristics of a dry clutch in a vehicle, comprising:
    when a transmission torque to actuator stroke of the dry clutch (T-S curve is adjusted with a new learning point, examining, by a controller, inclinations between characteristic points on the T-S curve adjacent to the new learning point and determining, by the controller, whether the inclinations change by a predetermined reference value or greater;
    when the determining of whether the inclinations change by the predetermined reference value or greater determines that inclinations at a characteristic point change greater than the predetermined reference valve, creating by the controller, offset points using the characteristic point as a reference characteristic point such that the offset points are spaced a predetermined distance in a vertical direction along a direction of the transmission torque in the T-S curve from the reference characteristic point;
    creating by the controller, a tendency line using the reference characteristic point and the offset points created at the process of creating the offset points;
    adjusting by the controller, the reference characteristic point of the dry clutch with respect to the actuator stroke of an actuator actuating the dry clutch, by moving the reference characteristic point along toward the tendency line; and
    controlling by the controller, the actuator according to the moved reference characteristic point.

2. The method according to claim 1, further comprising:
    repeating by the controller, the process of determining whether the inclinations change by the predetermined reference value or greater after adjusting the reference characteristic point, and when the inclinations change within the predetermined reference value, terminating control; and
    when the inclinations change greater than the predetermined reference value, creating by the controller, the offset points by using the characteristic point as the reference characteristic point and changing amounts of the offsets at the process of creating the offset points, and then repeating the process of creating the tendency line and the process of adjusting the reference characteristic point.

3. The method according to claim 2, wherein creating the offset points comprises creating the offset points on straight lines which are respectively connected from the reference characteristic point to two different characteristic points that are positioned below and above the reference characteristic point.

4. The method according to claim 2, wherein the amounts with which the offset points are distanced upward and downward from the reference characteristic point are set depending on an amount with which the inclination of the reference characteristic point changes.

5. The method according to claim 2, wherein creating the tendency line comprises the tendency line from the reference characteristic point and the offset points, which are created at the process of creating the offset points, by a least square method.

6. The method according to claim 2, wherein adjusting the reference characteristic point comprises moving the reference characteristic point of the offset points in a lateral direction following a direction of the actuator stroke to arrive at a point that is on the tendency line.

* * * * *